May 27, 1969 R. D. BECK 3,446,244
FLUIDIC CONTROLLED WATER VALVE OR THE LIKE AND PARTS THEREFOR
Filed June 8, 1966 Sheet 1 of 2

INVENTOR,
ROLAND D. BECK

BY

*Cander & Cander*

HIS ATTORNEYS

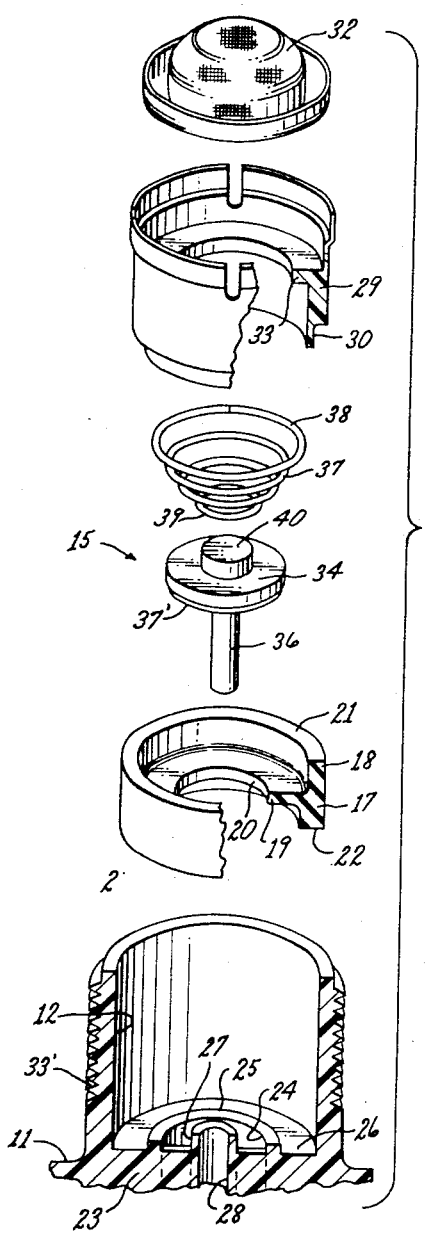
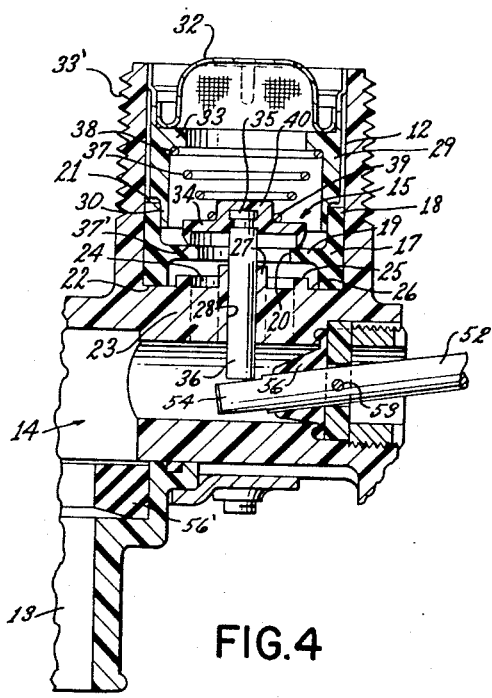

United States Patent Office 3,446,244
Patented May 27, 1969

3,446,244
FLUIDIC CONTROLLED WATER VALVE OR THE LIKE AND PARTS THEREFOR
Roland D. Beck, La Crescenta, Calif., assignor to Robertshaw Controls Company, Richmond, Va., a corporation of Delaware
Filed June 8, 1966, Ser. No. 556,049
Int. Cl. F16k 11/22, 31/145
U.S. Cl. 137—606
12 Claims

ABSTRACT OF THE DISCLOSURE

This disclosure relates to a water valve having a valve seat member disposed between the inlet and outlet therof and being provided with a flexible internal flange which is flexed in an unconstrained manner by a valve member seating against the valve seat flange and being forced thereagainst by the pressure of the fluid in the inlet whereby such free flexing of the resilient flange prevents adverse "water-hammer."

---

This invention relates to an improved water valve or the like as well as to improved parts therefor or the like.

It is well known that various water valves have been provided for domestic appliances or the like, such as water mixing valves for controlling the temperature and amount of water being automatically directed into an automatic clothes washing machine during the wash and/or rinse cycles thereof.

Usually such water mixing valves include actuators that move various valve members between their open and closed positions at the proper time during the operation of the washing machine.

The valve members for such water mixing valves and the like are normally disposed on the inlet side of their respective valve seats so that the force of the water entering the mixing valve will tend to seat the valve member against its respective valve seat and thereby prevent leakage.

However, it has been found that when the actuator has moved such valve member to an open position in opposition to the force of the fluid flowing therethrough, subsequent deactuation of the actuator causes the valve member to be rapidly moved toward the valve seat by the head of water behind the same whereby unusually loud valve closing noise is experienced with such water mixing valve and the like, such adverse noise commonly being known as "water hammer" or the like.

According to the teachings of this invention, an improved water valve or the like is provided wherein such "water-hammer" is substantially eliminated whereby the operation of the water valve or the like of this invention is relatively quiet when compared with prior known water valves.

Accordingly, it is an object of this invention to provide an improved water valve or the like having one or more of the novel features set forth above or hereinafter shown or described.

Another object of this invention is to provide improved parts for such a water valve or the like, the improved parts of this invention having one or more of the novel features set forth above or hereinafter shown or described.

Other objects, uses and advantages of this invention are apparent from a reading of this description, which proceeds with reference to the accompanying drawings forming a part thereof and wherein:

FIGURE 4 is a view similar to FIGURE 3 and illustrates the valve member in its normally closed position.

FIGURE 5 is an exploded, perspective view illustrating various parts of the structure illustrated in FIGURE 2.

Figure 1:
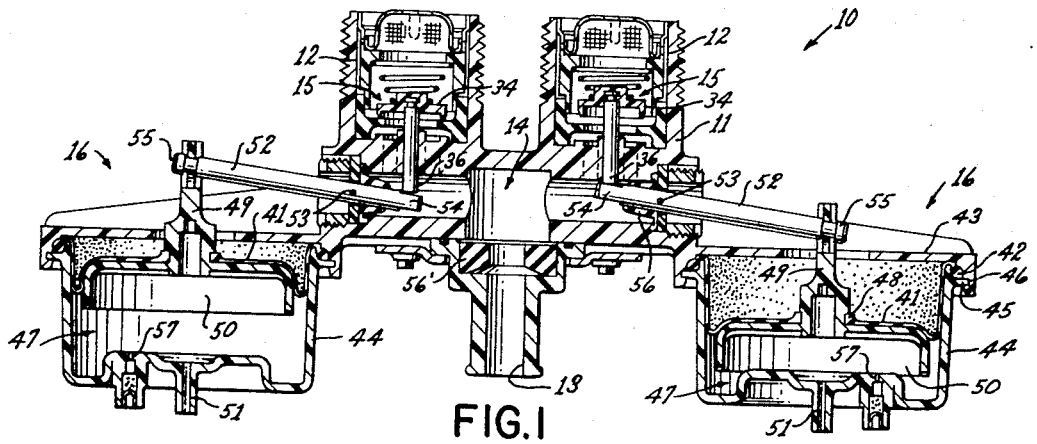
FIGURE 1 is a cross-sectional view illustrating an improved water valve of this invention.

While the various features of this invention are hereinafter described and illustrated as being particularly adaptable for providing a water mixing valve or the like, it is to be understood that the various features of this invention can be utilized in other types of valve apparatus as desired.

Therefore, this invention is not to be limited to only the embodiment illustrated in the drawings, because the drawings are merely utilized to illustrate one of the wide variety of uses of this invention.

Referring now to FIGURE 1, the improved water mixing valve of this invention is generally indicated by the reference numeral 10 and comprises a housing means 11 having a pair of inlet bores 12 and an outlet bore 13 formed therein, the inlets 12 being interconnected to the outlet 13 by passage means 14 formed in the housing 11 in a manner hereinafter described.

Each inlet 12 has a valve means 15 provided therein and controlled by a fluidic operated actuator 16 in a manner hereinafter described whereby only the left-hand valve means 15 and 16 of the water mixing valve 10 will be described in detail as the left-hand valve means 15 and actuator means 16 are identical thereto.

In particular, each valve means 15 includes a resilient valve seat member 17 having a cylindrical portion 18 received in the particular inlet bore 12, the valve seat member 17 having an inwardly directed annular flexible flange 19 provided with a passage means 20 passing centrally therethrough. The flange 19 is disposed intermediate the opposed ends 21 and 22 of the cylindrical portion 18, the lower end 22 of the cylindrical portion 18 being thicker in cross section than the upper end 21 thereof.

The housing 11 has a shoulder means 23 closing off the inlet bore 12 while being provided with a pair of C-shaped aperture means 24 passing therethrough to fluidly interconnect the passage means 20 of the valve seat member 17 with the passage means 14 that leads to the outlet 13. The C-shaped aperture means 24 are bounded by an annular raised rib 25 on the upper side 26 of the housing shoulder means 23 for a purpose hereinafter described.

The side 26 of the shoulder means 23 of the housing 11 has a centrally disposed projection 27 with a guide bore 28 passing centrally therethrough and interconnected to the passage 14.

The end 22 of the valve seat member 17 is disposed on the upper surface 26 of the shoulder 23 whereby the annular flange 19 thereof is disposed spaced above the annular rib 25 in the manner illustrated in FIGURE 4, the annular rib 25 limiting downward flexure of the flange 19 as will be apparent hereinafter.

A substantially cylindrical retainer 29 is disposed in the inlet bore 12 and has an inwardly offset lower flange 30 which overlaps the upper end 21 of the valve seat member 18 to properly position and hold the valve seat member 17 in its assembled position illustrated in FIGURE 4. The upper end of the retainer 29 is press-fit into the bore 12 to hold the parts 29 and 17 in their assembled and stacked relation.

In addition, a suitable filter screen 32 or the like is disposed in the inlet bore and engages against an inwardly directed annular flange 33 of the retainer 29 whereby the water from a water supply line being interconnected to the particular inlet 12 by suitable coupling means disposed in threaded relation with external threads 33' on the housing 11 will have to pass through the filter means 32 before reaching the valve seat member 17.

The valve means 15 includes a valve member 34 formed of plastic or the like and molded to a rivet shaped end 35 of an actuating stem 36 which projects through the passage means 20 of the valve seat member 17 and through the guide bore 28 of the shoulder means 23 to be actuated by the actuator 16 in a manner hereinafter described.

The valve member 34 has an annular and slightly bevelled depending edge 37' for engaging the flange 19 of the valve seat member 17 to close the inlet 12 from the passage means 20 passing through the valve seat member 17.

The valve member 34 is normally urged to its closed position by a compression spring 37 having one end 38 disposed against the under side of the flange 33 of the retainer 29 and the other end 39 telescoped over a tubular projection 40 of the valve member 34, the compression spring 37 having a substantially frusto-conical configuration.

The actuator 16 of the water mixing valve 10 of FIGURE 1 includes a flexible rolling diaphragm 41 having its outer periphery 42 held in sealing relation against a platform means 43 of the housing 11 by a cup-shaped member 44 having a flange 45 snap fitted into an annular recess 46 of the plaftorm means 43 whereby the diaphragm 41 cooperates with the cup-shaped member 44 to define a chamber 47 therebetween. The inner periphery 48 of the diaphragm 41 is secured to an actuating post 49 having a back-up member 50 disposed in the chamber 37.

The interior of the chamber 47 is adapted to be interconnected to a vacuum source by a conduit means 51 of the cup-shaped member 44. In this manner, when a vacuum is imposed in the chamber 47, the diaphragm 41 is pulled downwardly in the manner illustrated by the right-hand actuator 16 of FIGURE 1.

Conversely, when air is permitted to return to the chamber 47 of a partciular actuator 16, the diaphragm 41 can assume the deactuated position as illustrated by the left-hand actuator 16 in FIGURE 1.

Each actuator 16 includes a rocker arm 52 pivotally mounted to the housing means 11 by pivot pin means 53 disposed intermediate the opposed ends 54 and 55 of the respective rocker arm 52, the end 54 of the rocker arm 52 projecting into the passage 14 of the housing 11 and being fluidly sealed thereto by suitable sealing means 56.

The other end 55 of each rocker arm 52 is adapted to be interconnected in any suitable manner to the actuating post 49 of its respective actuator 16 while the other end 54 thereof is engageable with the lower end of the stem 36 of a particular valve member 34.

The operation of the water mixing valve 10 of this invention will now be described.

Since each valve means 15 of the mixing valve 10 of this invention operates in the same manner, only the operation of the right-hand valve means 15 will now be described as such description will be sufficient to understand the like operation of the left-hand valve means 15.

With the actuator 16 disposed in its deactuated condition, i.e., without a vacuum being imposed in the chamber 47 thereof, the valve member 34 is disposed against the valve seat member 17 and is held against the flange 19 thereof not only by the force of the compression spring 37 but also by the force of the head of water being directed to the inlet bore 12 by the supply conduit or the like.

Figure 2:
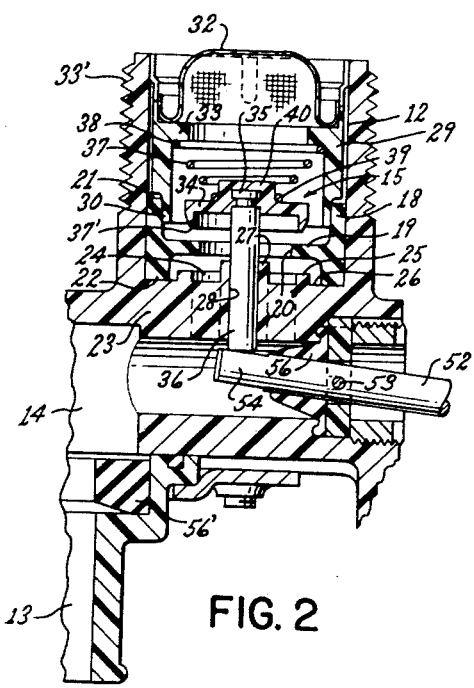
FIGURE 2 is an enlarged, fragmentary cross-sectional view of part of the water valve of FIGURE 1 and illustrates the valve member thereof in its opened position.

When the particular valve member 34 is to be opened, a vacuum is imposed in the chamber 47 of the actuator 16 to pull the rolling diaphragm 41 downwardly whereby such actuation of the actuator 16 causes the rocker arm 52 to pivot in a clockwise direction so that the end 54 thereof will push the valve stem 36 upwardly in opposition to the force of the compression spring 37 and the force of the water head in the inlet bore 12 whereby the valve member 34 will be moved away from the valve seat to the position illustrated in FIGURE 2. With the valve member 34 now in its opened position, the water in the inlet 12 is adapted to flow through the opened valve seat member 17, C-shaped aperture means 24 and into the passage means 14 to be directed out of the outlet 13. If desired, the outlet 13 can include a suitable flow control washer means 56' to maintain a certain flow out of the outlet 13 regardless of the amount of opening of the valve member 34.

In addition, it is to be understood that one or both valve members 34 may be opened in the same manner so that both hot and cold water will be directed into the passage means 14 by the respective open valve members 34 in order to have warm water discharged from the outlet 13.

When a particular actuated actuator means 16 is to be deactuated, the vacuum source is disconnected from the chamber 47 thereof and air is permitted to return to the chamber 47 either through the conduit means 51 or by means of an orifice 57 formed in the cup-shaped member 44 and interconnecting the atmosphere with the chamber 47.

In any event, with air now returning to the chamber 47, the force of the compression spring 37 as well as the force of the water flowing through the opened inlet 12 causes the valve member 34 to move toward the valve seat member 17 to again close the same in the manner illustrated in FIGURE 4.

However, it has been found that the force of the water, together with the force of the compression spring 37, tends to cause the open valve member 34 to strike the valve seat member 17 in such a manner that a relatively loud noise is produced by the slap of the valve member 34 against the valve seat member 17.

Figure 3:
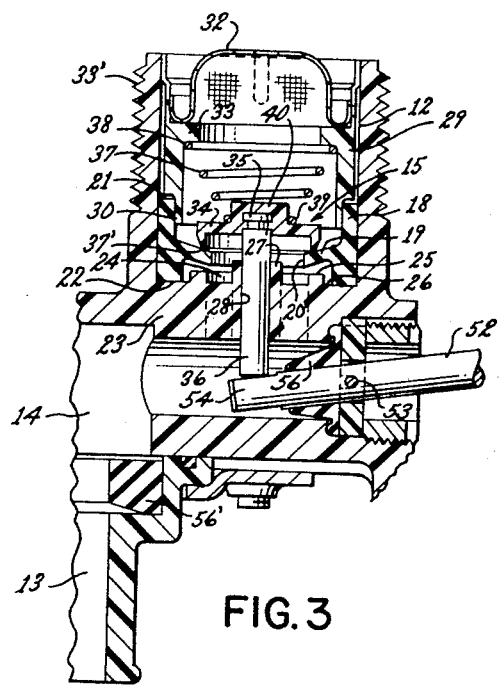
FIGURE 3 is a view similar to FIGURE 2 and illustrates the valve member in its initially closed position.

One of the features of this invention is to form the valve seat member 17 of a flexible material, such as plastic or the like, so that when the valve member 34 is initially moved to its closed position upon deactuation of its respective actuator 16, the force of the movement of the valve member 34 against the annular flange 19 of the valve seat member 17 causes the flange 19 to flex downwardly in the manner illustrated in FIGURE 3 to slowly and progressively retard the closing movement of the valve member 34 so that no loud closing noise is provided.

Thereafter, the natural resiliency of the flange 19 of the valve seat member 17 returns to the position illustrated in FIGURE 4 while the force of the compression spring 37 and head of water in the inlet 12 maintains the valve member 34 in sealing relationship against the flange 19 of the valve seat member 17.

Thus, it can be seen that the movement of the valve member 34 to its closed position does not result in a valve slap or loud noise upon the initial impact thereof with the valve seat member 17 of this invention because of the flexing of the annular flange 19 thereof and subsequent bouncing and vibrations of the valve seat member 34 relative to the valve seat member 17 is also eliminated by the flexibility of the annular flange 19 thereof.

Accordingly, the so-called "water-hammer" problem normally encountered in conventional water valves and the like is substantially reduced or completely eliminated by the teachings of this invention.

Thus, not only is an improved water valve or the like provided by this invention, but also improved parts for such a water valve or the like are provided by this invention.

While the form of the invention now preferred has been disclosed as required by the statutes, other forms may be used all coming within the scope of the claims which follow.

What is claimed is:

1. A water valve or the like comprising housing means having an inlet interconnected to an outlet, a valve seat member carried by said housing means and disposed between said inlet and said outlet, said valve seat member having an outer portion provided with opposed ends and having a flexible internal flange provided with passage means therethrough to interconnect said inlet with said outlet, said flange being cantilevered to said valve seat member intermediate the opposed ends of said outer portion thereof and being adapted to be flexed toward said outlet only in opposition to the natural resiliency of said flange as said flange is not backed by a supporting structure other than the support provided by the outer portion of said valve seat member, and a movable valve member carried by said housing means for opening and closing said passage means, said valve member being disposed between said inlet and said flange whereby the force of fluid passing into said inlet tends to move said valve member to its closed position against said flange, said flange flexing during the seating of said valve member thereagainst to prevent adverse "water-hammer," or the like.

2. A water valve or the like as set forth in claim 1 wherein said valve member has an actuating stem passing through said passage means.

3. A water valve or the like as set forth in claim 2 and including actuator means carried by said housing means for moving said valve member relative to said valve seat member.

4. A water valve or the like as set forth in claim 3 wherein said actuator is pneumatically operated.

5. A water valve or the like as set forth in claim 3 wherein a rod is pivotally mounted to said housing means and has one end engageable with said stem and the other end moved by said actuator.

6. A water valve or the like as set forth in claim 1 wherein said housing has another inlet interconnected to said outlet and another like valve seat member and like valve member for selectively interconnecting said other inlet with said outlet.

7. A water valve or the like as set forth in claim 1 and including spring means carried by said housing means and normally tending to move said valve member to its closed position.

8. A water valve or the like as set forth in claim 1 wherein said valve seat member includes an outer cylindrical portion having opposed ends, said flange being interconnected to the internal peripheral surface of said cylindrical portion intermediate to said ends.

9. A water valve or the like as set forth in claim 8 wherein said housing means has shoulder means between said valve seat member and said outlet, said valve seat member having one of its said ends engaging said shoulder means whereby said flange is spaced from said shoulder means to permit flexing of said flange.

10. A water valve or the like as set forth in claim 9 wherein said shoulder means has aperture means passing therethrough to interconnect said passage means of said valve seat member with said outlet.

11. A water valve or the like as set forth in claim 10 wherein said valve member carries an actuating stem, said shoulder means having a guide bore passing therethrough and receiving said stem to guide movement of said valve member relative to said valve seat member.

12. A water valve or the like comprising housing means having an inlet interconnected to an outlet, a valve seat member carried by said housing means and disposed between said inlet and said outlet, said valve seat member having a flexible internal flange provided with passage means therethrough to interconnect said inlet with said outlet, a movable valve member carried by said housing means for opening and closing said passage means, said valve member being disposed between said inlet and said flange whereby the force of fluid passing into said inlet tends to move said valve member to its closed position against said flange, said flange flexing during the seating of said valve member thereagainst to prevent adverse "water-hammer," or the like, said valve seat member having an outer cylindrical portion having opposed ends, said flange being interconnected to the internal peripheral surface of said cylindrical portion intermediate to said ends, said housing means having shoulder means between said valve seat member and said outlet, said valve seat member having one of its said ends engaging said shoulder means whereby said flange is spaced from said shoulder means to permit flexing of said flange, and a cylindrical retainer means disposed in said inlet, said retainer means having an inwardly offset flange internally overlapping the other end of said cylindrical portion of said valve seat member to position and hold said valve seat member relative to said shoulder means.

References Cited

UNITED STATES PATENTS

| 1,957,567 | 5/1934 | Williams | 251—363 X |
| 2,409,220 | 10/1946 | Melichar et al. | 251—362 X |
| 3,250,295 | 5/1966 | Palmer et al. | 137—606 |
| 2,525,799 | 10/1950 | Hecker | 251—361 X |

ARNOLD ROSENTHAL, *Primary Examiner.*

U.S. Cl. X.R.

251—58, 333, 360